United States Patent
Ishii et al.

(10) Patent No.: US 6,509,872 B2
(45) Date of Patent: Jan. 21, 2003

(54) ADAPTIVE ANTENNA RECEIVING APPARATUS

(75) Inventors: Naoto Ishii, Tokyo (JP); Shousei Yoshida, Toky (JP); Akihisa Ushirokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/940,718

(22) Filed: Aug. 29, 2001

(65) Prior Publication Data

US 2002/0041253 A1 Apr. 11, 2002

(30) Foreign Application Priority Data

Aug. 30, 2000 (JP) ......................................... 2000-261175

(51) Int. Cl.[7] .............................. G01S 3/16; G01S 3/28
(52) U.S. Cl. ....................................... 342/383; 342/380
(58) Field of Search .................................. 342/380, 383

(56) References Cited

U.S. PATENT DOCUMENTS 5,473,333 A * 12/1995 Chiba et al. ................ 342/378

FOREIGN PATENT DOCUMENTS

| JP | 10-341200 | 12/1998 |
|----|-----------|---------|
| JP | 2914445   | 4/1999  |
| JP | 11-298388 | 10/1999 |
| JP | 2000-22612 | 2/2000 |

* cited by examiner

Primary Examiner—Theodore M. Blum
(74) Attorney, Agent, or Firm—Whitham, Curtis & Christofferson, P.C.

(57) ABSTRACT

An adaptive antenna receiving apparatus includes (a) a plurality of antennas, (b) a plurality of adaptive receivers each of which receives signals received in the antennas, in an adaptive antenna pattern in an order in which the signals arrived at the antennas, (c) a plurality of initial receipt weight calculators each of which calculates an initial antenna pattern for each of the signals, and outputs the thus calculated initial antenna pattern to each of the adaptive receivers, (d) an adder which adds output signals transmitted from each of the adaptive receivers, to one another, and (e) a judge which symbol-judges an output signal transmitted from the adder, and transmits an output signal to each of the adaptive receivers.

18 Claims, 10 Drawing Sheets

ADAPTIVE ANTENNA RECEIVING APPARATUS

BACKGROUND OF THE INVENTION

1. Field of the Invention

The invention relates to an adaptive antenna receiving apparatus, and more particularly to an adaptive antenna receiving apparatus which is capable of rapidly carrying out adaptive convergence by virtue of an initial weight close to a convergent value of adaptive weight.

2. Description of the Related Art

A CDMA (Code Division Multiple Access) adaptive antenna receiving apparatus has been conventionally used for removal of interference caused by antenna directivity, as suggested in the following documents:

(A) Oh, Kohno and Imai, "TDL Adaptive Array Antenna using diffusion gain for accomplishing spectrum diffusion multiple access", Electronic Information Communication Academy, Vol. J75-BII, No. 11, pp. 815–825, 1992; and (B) Tanaka, Miki and Sawahashi, "Characteristics of Judgment Feedback type Coherent Adaptive Diversity in DS-CDMA", Electronic Information Communication Academy, Radio Communication System Team Technical Report RC96-102, November 1996.

FIG. 1 is a block diagram of a conventional CDMA adaptive antenna receiving apparatus.

It is assumed that the illustrated CDMA adaptive antenna receiving apparatus includes N antennas wherein N is an integer equal to or greater than 2, and M multi-paths wherein M is an integer equal to or greater than 1, and is directed to a K-th user wherein K is an integer equal to or greater than 1.

With reference to FIG. 1, signals received at first to N-th antennas 110-1 to 110-N are divided to first to M-th paths in accordance with delay time, and input into both second to M-th delay units 120-2 to 120-M and first to M-th adaptive receivers 130-1 to 130-M. The delay units 120-2 to 120-M delay the input signals for synchronizing the input signals with the first path with respect to a timing. Thus, since the first delay unit 120-1 causes zero (0) delay, the first delay unit 120-1 is not illustrated in FIG. 1.

Output signals transmitted from the first to M-th adaptive receivers 130-1 to 130-M are added to one another in an adder 140, and the thus added output signals are inputted to a judge or evaluation circuit 150. The judge 150 transmits its output signal as a receipt symbol for the K-th user, which output signal is transmitted also to the first to M-th adaptive receivers 130-1 to 130-M.

Since the first to M-th adaptive receivers 130-1 to 130-M are designed to have the same structure, only the adaptive receiver for a m-th path ($1 \leq m \leq M$) is illustrated in FIG. 2.

The received signals are diffused and demodulated in first to N-th reverse diffusion units 161-1 to 161-N, and thereafter, transmitted to both first to N-th multipliers 162-1 to 162-N and a delay unit 163. The received signals are multiplied with receipt weight in first to N-th multipliers 162-1 to 162-N. The signals having been multiplied with receipt weight are added to one another in an adder 164. Thus, the received signals are weighted.

The thus weighted signals are transmitted to a multiplier 165, a communication path estimating unit 166 and an adder 169. The communication path estimating unit 166 estimates deformation in communication paths. The deformation estimated by the communication path estimating unit 166 is transmitted to the multiplier 165 through a complex conjugate generating unit 167, and is multiplied with the weighted signals in the multiplier 165.

An output signal transmitted from the multiplier 165 defines a demodulated signal for the m-th path, and is transmitted to the adder 140 illustrated in FIG. 1.

The adder 140 adds output signals transmitted from the first to M-th adaptive receivers 130-1 to 130-M, to one another in RAKE synthesis, and transmits an output signal to the judge 150, which judges the signals with respect to data symbol.

In the adaptive receiver, an output signal transmitted from the judge 150 is multiplied with an output signal transmitted from the communication path estimating unit 166, in a multiplier 168, and then, input into the adder 169. The adder 169 calculates an error by subtracting an output transmitted from the adder 164, from an output transmitted from the multiplier 168, and transmits the thus calculated error to an adaptively updating unit 170.

The adaptively updating unit 170 updates receipt weight, based on the error transmitted from the adder 169 and a signal received at the antenna which signal is delayed by the delay unit 163 by a period of time necessary for demodulating the signal. Herein, there may be used a known algorithm such as least mean square algorithm, as an algorithm for adaptively updating receipt weight.

In the above-mentioned conventional adaptive antenna receiving apparatus, adaptive control is usually carried out by selecting a weight by which signals can be received regardless of signal-receipt conditions, as initial receipt weight, in order to make it possible to receive signals in any conditions, taking into consideration that signals come in different directions in dependence on signal-receipt conditions. For instance, a weight by which antenna directivity is non-directional is selected as such a weight. However, this causes a problem that it would take much time for receipt weight to converge to optimal receipt weight after receipt weight has been started to be adaptively updated.

Japanese Patent No. 2914445 (Japanese Unexamined Patent Publication No. 11-55216) has suggested the CDMA adaptive receiving apparatus including a weighting and synthesizing unit and a weight controller for one user. The weighting and synthesizing unit carries out weighting and synthesis for each of CDMA signals received in N antennas. The CDMA adaptive receiving apparatus further includes an error generator which (a) generates M error signals associated with each of paths for a desired wave signal, based on a communication path estimate and M demodulated signals which are demodulated at timings associated with M paths constituting a multi-path, based on signals transmitted from the weighting and synthesizing unit, and (b) synthesizes the error signals into one signal, which is to be transmitted to the weight controller.

Japanese Unexamined Patent Publication No. 10-341200 has suggested an adaptive array antenna receiving apparatus including a complex multiplying unit which multiplies received signals with a complex weight coefficient, an adder which adds output signals transmitted from the complex multiplying unit, to one another, a modulator which modulates known symbols, a subtracter which calculates a difference between an output signal transmitted from the adder and an output signal transmitted from the modulator, and a weight coefficient calculator which calculates the complex weight coefficient, based on the received signals and an output signal transmitted from the subtracter, only when known signal patterns in a desired station and an interference station are different from each other.

Japanese Unexamined Patent Publication No. 11-298388 has suggested an adaptive receiving apparatus including N antennas which receive signals multiplexed by a plurality of user signals, K adaptive receiving blocks associated with K users, which K adaptive receiving blocks form a directional pattern having a gain in any direction relative to the signals received at the antennas, and receive desired wave signals through a plurality of paths to thereby suppress interference wave signals, and a synthesizer which synthesizes a plurality of weight control errors with a user by means of path combination to thereby transmit a synthesized weight control error signal. Herein, N and K are integers both equal to or greater than 1. The adaptive receiving blocks form the directional pattern, based on the synthesized weight control error signal.

Japanese Unexamined Patent Publication No. 2000-22612 has suggested a CDMA type adaptive transceiver including a path searcher which extracts path level information and path delay time information out of signals received at antennas, M adaptive receivers which receive N signals having been received at the antennas, form a directional pattern having a gain in a direction of a desired wave signal every path delay time, and receives the desired wave signal to thereby suppress an interference wave signal, an antenna weight selector which selects antenna weights associated with L transmission paths out of M antenna weights, based on the path level information, L antenna weight controllers which determine transmission antenna weights defining a transmission directional pattern, based on an output signal transmitted from the antenna weight selector, and an adaptive transmitter which forms the transmission directional pattern having a gain in a user direction, by virtue of the transmission antenna weight transmitted from the antenna weight controllers, and transmits N antenna transmission signals used for transmitting the desired wave signal, wherein N is a positive integer, M is a positive integer, and L is an integer equal to or smaller than M.

The above-mentioned problem remain unsolved even in the above-mentioned Publications.

SUMMARY OF THE INVENTION

In view of the above-mentioned problems in the conventional adaptive antenna receiving apparatus, it is an object of the present invention to provide an adaptive antenna receiving apparatus which is capable of determining initial antenna receipt weight in accordance with signal-receiving conditions, and enhancing a convergence rate at which receipt weight is adaptively updated.

The adaptive antenna receiving apparatus in accordance with the present invention is characterized in that receipt weight is estimated before receipt weight is updated or during receipt weight is being updated, and determines the estimated receipt weight as initial receipt weight.

Specifically, there is provided an adaptive antenna receiving apparatus which receives signals at a plurality of antennas, multiplies each of the thus received signals with a weighting coefficient, and adds the products to one another to thereby detect the signals, including (a) an initial weighting coefficient calculator which calculates an initial weighting coefficient, based on the received signals, and (b) an adaptive receiver which updates the weighting coefficient in accordance with the received signals.

When the signals are comprised of a plurality of burst signals to be received at a certain interval, the initial weighting coefficient calculator may calculate the initial weighting coefficient for each of the burst signals, and the adaptive receiver may update the weighting coefficient in accordance with the received signals in the same burst signal.

There is further provided an adaptive antenna receiving apparatus including (a) a plurality of antennas, (b) a plurality of adaptive receivers each of which receives signals received in the antennas, in an adaptive antenna pattern in an order in which the signals arrived at the antennas, (c) a plurality of initial receipt weight calculators each of which calculates an initial antenna pattern for each of the signals, and outputs the thus calculated initial antenna pattern to each of the adaptive receivers, (d) an adder which adds output signals transmitted from each of the adaptive receivers, to one another, and (e) a judge which symbol-judges an output signal transmitted from the adder, and transmits an output signal to each of the adaptive receivers.

Each of the adaptive receivers may be comprised of (b1) a plurality of first multipliers each of which multiplies each of the received signals with a weighting coefficient, (b2) an adder which outputs transmitted from the first multipliers, to one another, (b3) a communication path estimating unit which estimates a communication path, based on an output signal transmitted from the adder, and outputs a first signal indicative of an estimated communication path, (b4) a second multiplier which multiplies an output signal transmitted from the judge, with the first signal, (b5) a subtracter which subtracts an output signal transmitted from the second multiplier, from an output signal transmitted from the adder, and (b6) an updating unit which adaptively calculates receipt weight, based on an output signal transmitted from the subtracter, a signal obtained by delaying the received signals, and initial receipt weight transmitted from each of the initial receipt weight calculators, each of the adaptive receivers controlling its receipt weight independently of other adaptive receivers.

Each of the initial receipt weight calculators may be comprised of (c1) a plurality of communication path estimating units each receiving each of signals received in the antennas, and (c2) a plurality of complex conjugate generators each receiving an output signal transmitted from each of the communication path estimating units, and wherein an output signal transmitted from each of the complex conjugate generators is transmitted to each of the adaptive receivers as an initial value for weight control to be made in each of the adaptive receivers.

Each of the initial receipt weight calculators may be comprised of (c1) a plurality of communication path estimating units each receiving each of signals received in the antennas, (c2) a direction estimating unit which estimates a direction in which a signal comes to the antennas, based on output signals transmitted from the communication path estimating units, and (c3) a receipt weight calculator which calculates receipt weight, based on output signals transmitted from the direction estimating unit, and wherein the receipt weight calculator transmits its output signal to each of the adaptive receivers in accordance with a signal transmitted from each of the delay detectors as an initial value for weight control to be made in each of the adaptive receivers.

There is still further provided a CDMA adaptive antenna receiving apparatus including (a) a plurality of antennas, (b) a plurality of adaptive receivers which receive signals received in the antennas, in an adaptive antenna pattern in an order in which the signals arrived at the antennas, (c) a plurality of initial receipt weight calculators each of which calculates an initial antenna pattern for each of the signals, and outputs the thus calculated initial antenna pattern to each of the adaptive receivers, (d) an adder which adds output signals transmitted from each of the adaptive receivers, to one another, and (e) a judge which symbol-judges an output signal transmitted from the adder, and transmits an output signal to each of the adaptive receivers.

In the CDMA adaptive antenna receiving apparatus, each of the adaptive receivers may be comprised of (b1) a plurality of reverse diffusion units each associated with each of the signals received in the antennas, (b2) a plurality of first multipliers each of which multiplies each of output signals transmitted from the reverse diffusion units, with a weighting coefficient, (b3) an adder which outputs transmitted from the first multipliers, to one another, (b4) a communication path estimating unit which estimates a communication path, based on an output signal transmitted from the adder, and outputs a first signal indicative of an estimated communication path, (b5) a second multiplier which multiplies an output signal transmitted from the judge, with the first signal, (b6) a subtracter which subtracts an output signal transmitted from the second multiplier, from an output signal transmitted from the adder, and (b7) an updating unit which adaptively calculates receipt weight, based on an output signal transmitted from the subtracter, signals obtained by delaying signals transmitted from the reverse diffusion units, and initial receipt weight transmitted from each of the initial receipt weight calculators, each of the adaptive receivers controlling its receipt weight independently of other adaptive receivers.

In the CDMA adaptive antenna receiving apparatus, each of the initial receipt weight calculators may be comprised of (c1) a plurality of reverse diffusion units each associated with each of the signals received in the antennas, (c2) a plurality of communication path estimating units each receiving an output signal transmitted from each of the reverse diffusion units, and (c3) a plurality of complex conjugate generators each receiving an output signal transmitted from each of the communication path estimating units, and wherein an output signal transmitted from each of the complex conjugate generators is transmitted to each of the adaptive receivers as an initial value for weighting control to be made in each of the adaptive receivers.

In the CDMA adaptive antenna receiving apparatus, each of the initial receipt weight calculators may be comprised of (c1) a plurality of reverse diffusion units each associated with each of the signals received in the antennas, (c2) a plurality of communication path estimating units each receiving an output signal transmitted from each of the reverse diffusion units, (c3) a direction estimating unit which estimates a direction in which a signal comes to the antennas, based on output signals transmitted from the communication path estimating units, and (c4) a receipt weight calculator which calculates receipt weight, based on output signals transmitted from the direction estimating unit, and wherein the receipt weight calculator transmits its output signal to each of the adaptive receivers as an initial value for weight control to be made in each of the adaptive receivers.

There is yet further provided an adaptive antenna receiving apparatus including (a) a plurality of antennas, (b) a plurality of adaptive receivers which receive signals received in the antennas, in an adaptive antenna pattern in an order in which the signals arrived at the antennas, (c) a plurality of initial receipt weight calculators each of which calculates initial receipt weight for adaptive control by means of the antenna pattern, and outputs the thus calculated initial receipt weight to each of the adaptive receivers, (d) a plurality of delay detectors each of which detects a directional difference between receipt weight calculated by each of the adaptive receivers and a direction in which the signals come to the antennas, estimated by the initial receipt weight calculators, and notifies each of the initial receipt weight calculators that the directional difference is over a predetermined directional difference threshold such that each of the initial receipt weight calculators transmits the initial receipt weight to each of the adaptive receivers, (e) an adder which adds output signals transmitted from each of the adaptive receivers, to one another, and (f) a judge which symbol-judges an output signal transmitted from the adder, and transmits an output signal to each of the adaptive receivers.

In the adaptive antenna receiving apparatus, each of the adaptive receivers may be comprised of (b1) a plurality of first multipliers each of which multiplies each of the received signals with a weighting coefficient, (b2) an adder which outputs transmitted from the first multipliers, to one another, (b3) a communication path estimating unit which estimates a communication path, based on an output signal transmitted from the adder, and outputs a first signal indicative of an estimated communication path, (b4) a second multiplier which multiplies an output signal transmitted from the judge, with the first signal, (b5) a subtracter which subtracts an output signal transmitted from the second multiplier, from an output signal transmitted from the adder, and (b6) an updating unit which calculates receipt weight, based on an output signal transmitted from the subtracter, a signal obtained by delaying the received signals, and the initial receipt weight, each of the adaptive receivers controlling its receipt weight independently of other adaptive receivers and outputting the controlled receipt weight to each of the delay detectors.

In the adaptive antenna receiving apparatus, each of the initial receipt weight calculators may be comprised of (c1) a plurality of communication path estimating units each receiving each of signals received in the antennas, (c2) a direction estimating unit which estimates a direction in which a signal comes to the antennas, based on output signals transmitted from the communication path estimating units, and (c3) a receipt weight calculator which calculates receipt weight, based on output signals transmitted from the direction estimating unit, and wherein the direction estimating unit transmits its output signal to the receipt weight calculator, and the receipt weight calculator transmits its output signal to each of the adaptive receivers in accordance with a signal transmitted from each of the delay detectors as initial value for weight control to be made in each of the adaptive receivers.

In the adaptive antenna receiving apparatus, each of the delay detectors may be comprised of (d1) a peak direction detector which detects a direction of maximum directivity of the receipt weight, based on receipt weight transmitted from the adaptive receivers, and (d2) a comparator which detects a difference in a peak direction between a direction transmitted from each of the initial receipt weight calculators and the direction of maximum directivity, and transmits a signal to the initial receipt weight calculators such that each of the initial receipt weight calculators transmits the initial receipt weight, when the difference is over a predetermined threshold difference.

There is still yet further provided a CDMA adaptive antenna receiving apparatus including (a) a plurality of antennas, (b) a plurality of adaptive receivers which receive signals received in the antennas, in an adaptive antenna pattern in an order in which the signals arrived at the antennas, (c) a plurality of initial receipt weight calculators each of which calculates initial receipt weight for adaptive control by means of the antenna pattern, and outputs the thus calculated initial receipt weight to each of the adaptive receivers, (d) a plurality of delay detectors each of which detects a directional difference between a weighting coefficient calculated by each of the adaptive receivers and a direction in which the signals come to the antennas, estimated by the initial receipt weight calculators, and notifies each of the initial receipt weight calculators that the directional difference is over a predetermined directional difference threshold such that each of the initial receipt weight calculators transmits the initial antenna pattern to each of the adaptive receivers, (e) an adder which adds output signals transmitted from each of the adaptive receivers, to one another, and (f) a judge which symbol-judges an output signal transmitted from the adder, and transmits an output signal to each of the adaptive receivers.

In the CDMA adaptive antenna receiving apparatus, each of the adaptive receivers may be comprised of (b1) a plurality of reverse diffusion units each associated with each of the signals received in the antennas, (b2) a plurality of first multipliers each of which multiplies each of output signals transmitted from the reverse diffusion units, with a weighting coefficient, (b3) an adder which outputs transmitted from the first multipliers, to one another, (b4) a communication path estimating unit which estimates a communication path, based on an output signal transmitted from the adder, and outputs a first signal indicative of an estimated communication path, (b5) a second multiplier which multiplies an output signal transmitted from the judge, with the first signal, (b6) a subtracter which subtracts an output signal transmitted from the second multiplier, from an output signal transmitted from the adder, and (b7) an updating unit which calculates receipt weight, based on an output signal transmitted from the subtracter, signals obtained by delaying signals transmitted from the reverse diffusion units, and the initial receipt weight transmitted from each of the initial receipt weight calculators, each of the adaptive receivers controlling its receipt weight independently of other adaptive receivers and outputting the controlled receipt weight to each of the delay detectors.

In the CDMA adaptive antenna receiving apparatus, each of the initial receipt weight calculators may be comprised of (c1) a plurality of reverse diffusion units each associated with each of the signals received in the antennas, (c2) a plurality of communication path estimating units each receiving an output signal transmitted from each of the reverse diffusion units, and (c3) a direction estimating unit which estimates a direction in which a signal comes to the antennas, based on output signals transmitted from the communication path estimating units, and (c4) a receipt weight calculator which calculates receipt weight, based on output signals transmitted from the direction estimating unit, the direction estimating unit transmitting its output signal to the receipt weight calculator, the receipt weight calculator transmits its output signal to each of the adaptive receivers in accordance with a signal transmitted from each of the delay detectors as an initial value for weight control to be made in each of the adaptive receivers.

In the CDMA adaptive antenna receiving apparatus, each of the delay detectors may be comprised of (d1) a peak direction detector which detects a direction of maximum directivity of the receipt weight, based on receipt weight transmitted from the adaptive receivers, and (d2) a comparator which detects a difference in a peak direction between a direction transmitted from each of the initial receipt weight calculators and the direction of maximum directivity, and transmits a signal to the initial receipt weight calculators such that each of the initial receipt weight calculators transmits the initial weight, when the difference is over a predetermined threshold difference.

The advantages obtained by the aforementioned present invention will be described hereinbelow.

The first advantage is that it is possible to shorten a time necessary for receipt weight to converge. This is because that receipt weight which will accomplish in-phase synthesis is obtained before receipt weight is adaptively updated, and the thus obtained receipt weight is used as initial receipt weight for updating receipt weights.

The second advantage is that it is possible to prevent degradation in characteristics, caused by rapid change in a direction in which signals arrive at antennas. This is because that the adaptive antenna receiving apparatus in accordance with the present invention detects follow-up delay in adaptive control, caused by rapid change in a direction in which signals arrive at antennas, and presets receipt weight as optimal initial receipt weight.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
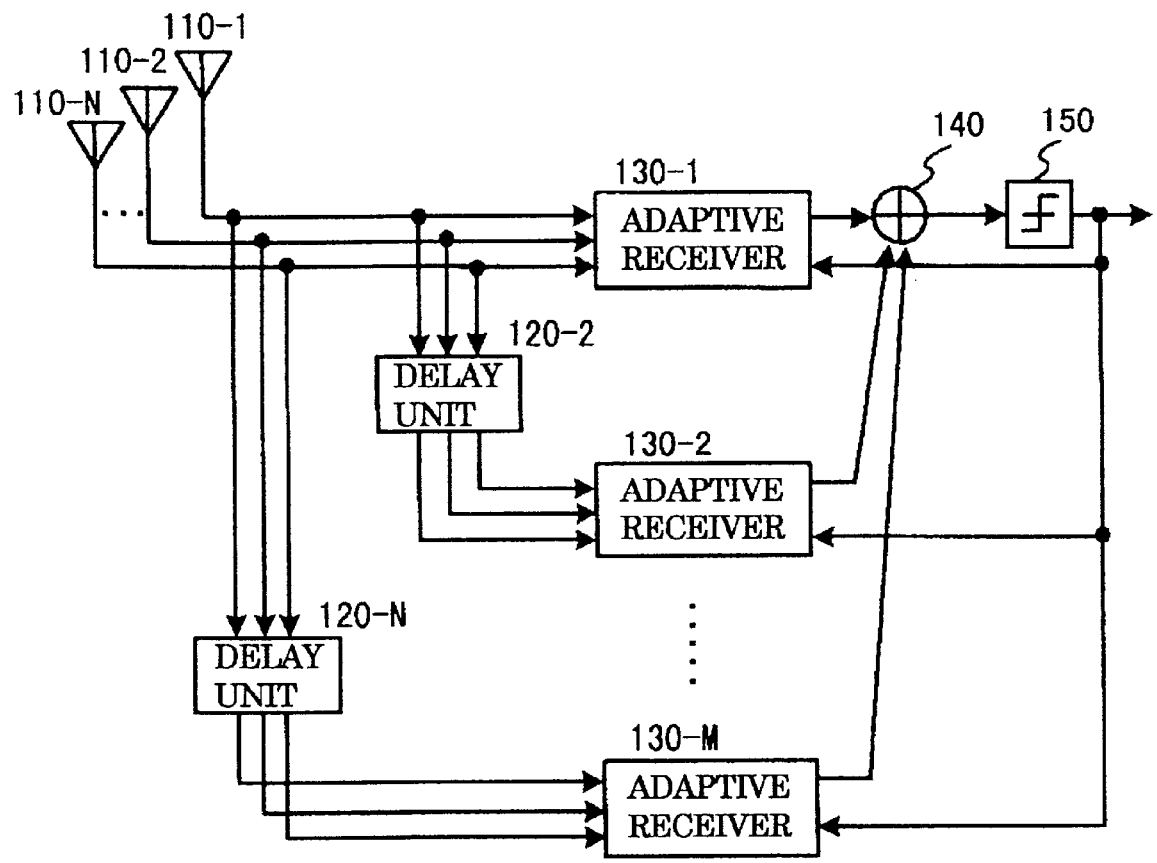
FIG. 1 is a block diagram of a conventional CDMA adaptive antenna receiving apparatus.
Figure 2:
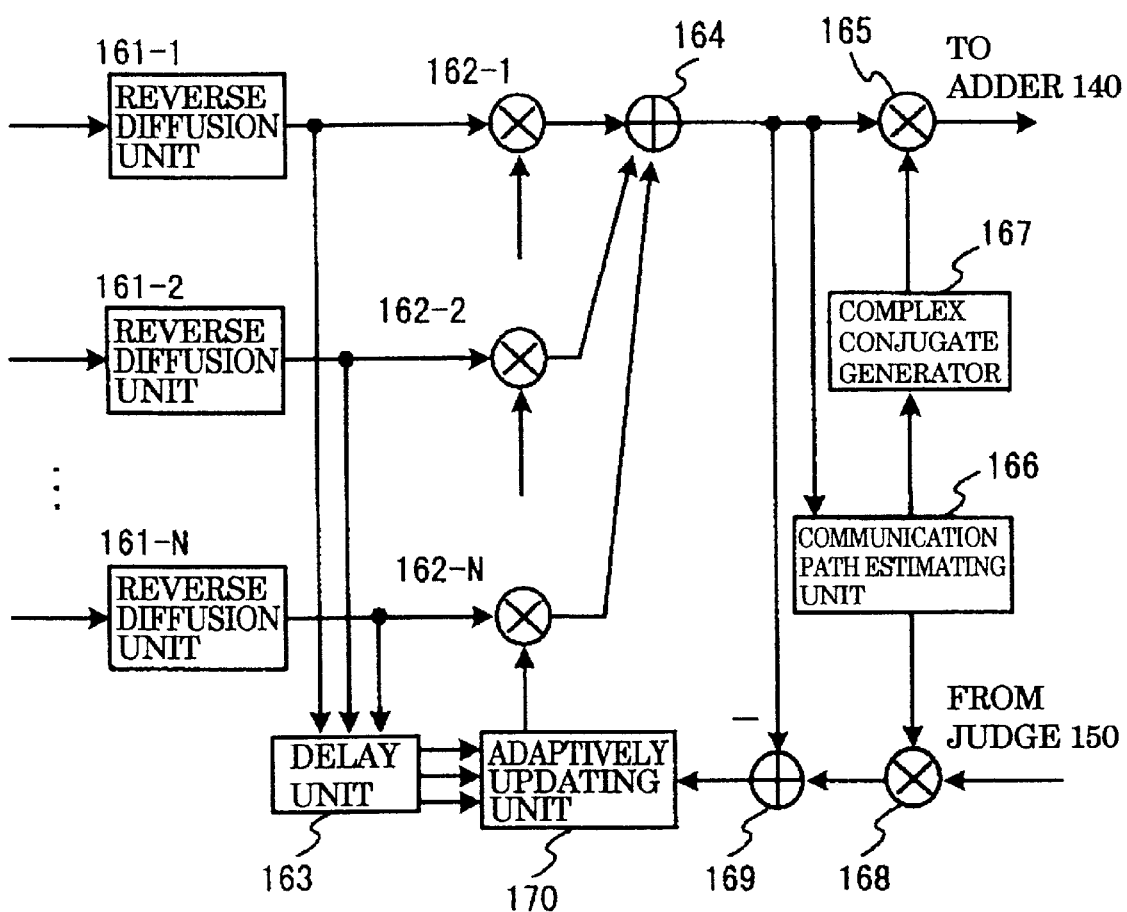
FIG. 2 is a block diagram of an adaptive receiver in the conventional CDMA adaptive antenna receiving apparatus illustrated in FIG. 1.
Figure 3:
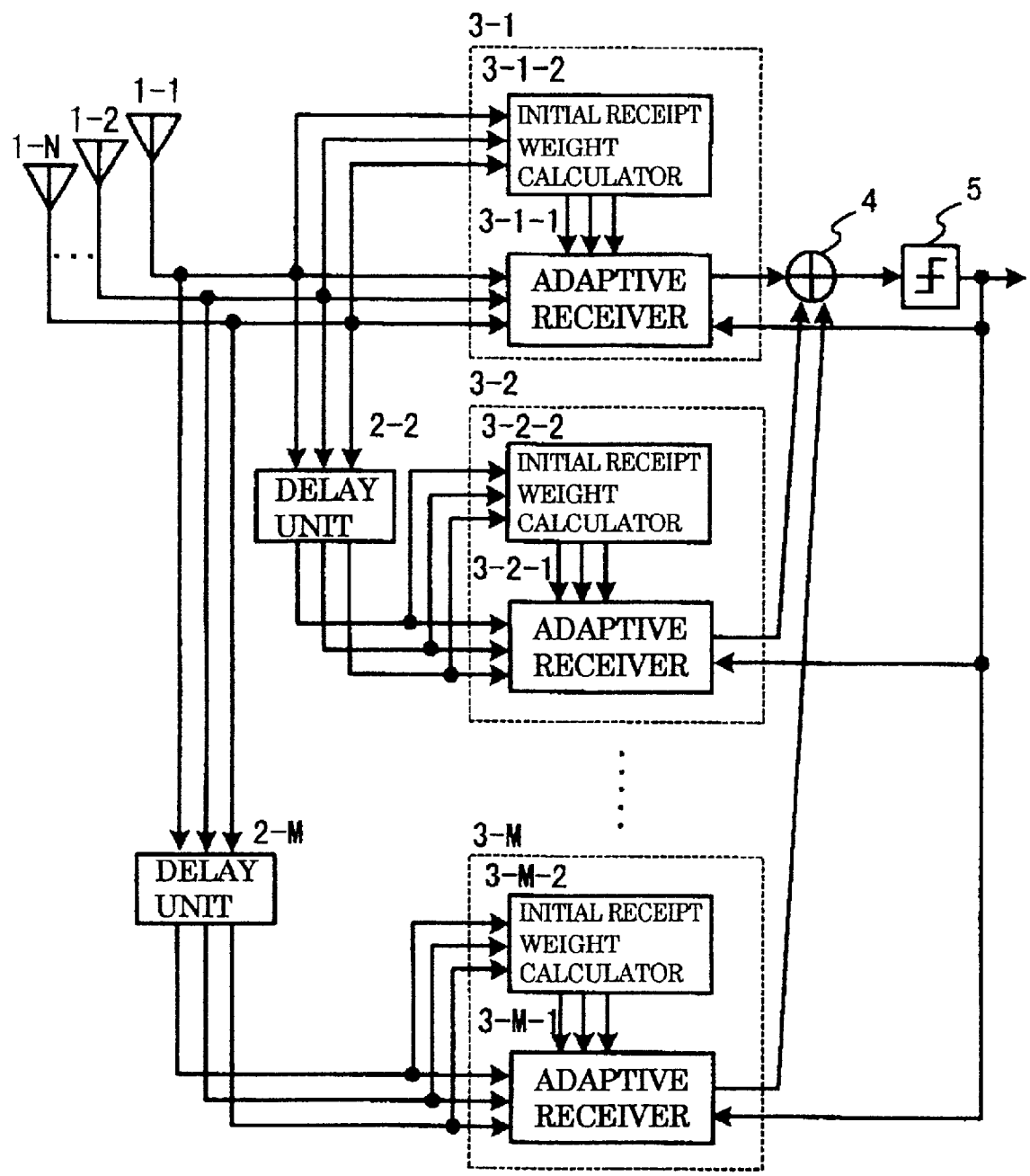
FIG. 3 is a block diagram of a CDMA adaptive antenna receiving apparatus in accordance with the first embodiment of the present invention.

FIG. 3 is a block diagram of a CDMA adaptive antenna receiving apparatus in accordance with the first embodiment of the present invention. The illustrated CDMA adaptive antenna receiving apparatus is directed to a K-th user wherein K is an integer equal to or greater than 1.

The CDMA adaptive antenna receiving apparatus is comprised of first to N-th antennas 1-1 to 1-N wherein N is an integer equal to or greater than 2, first to M-th multi-paths wherein M is an integer equal to or greater than 1, first to M-th receivers 3-1 to 3-M, first to (M−1)-th delay units 2-2 to 2-M, an adder 4, and a judge 5.

Each of the first to M-th receivers 3-1 to 3-M is comprised of an adaptive receiver 3-1-1 to 3-M-1, and an initial receipt weight calculator 3-1-2 to 3-M-2.

The first to N-th antennas 1-1 to 1-N are connected to the first to M-th receivers 3-1 to 3-M through the multi-paths. Signals received at the first to N-th antennas 1-1 to 1-N are transmitted directly to the first receiver 3-1, and transmitted to the second to M-th receivers 3-2 to 3-M through the first to (M−1)-th delay units 2-2 to 2-M. The. first to (M−1)-th delay units 2-2 to 2-M delays the received signals such that the received signals in the multi-paths are synchronized with one another.

Output signals transmitted from the first to M-th receivers 3-1 to 3-M are added to one another in the adder 4. The adder 4 transmits its output signal to the judge 5, and the judge 5 judges transmission symbol of the K-th user, based on the received output signal. The judged symbol is input into the first to M-th receivers 3-1 to 3-M for updating receipt weight.

Figure 4:
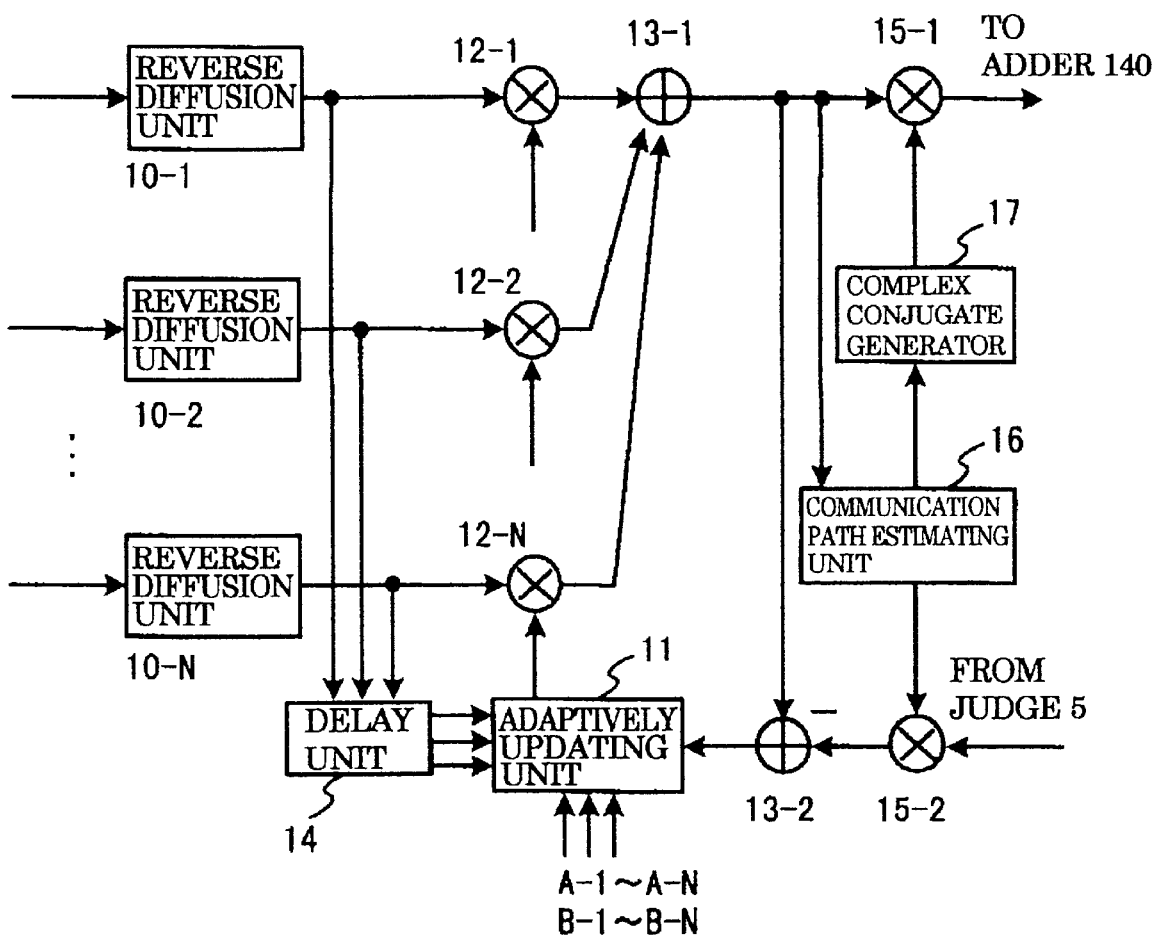
FIG. 4 is a block diagram of an adaptive receiver in the CDMA adaptive antenna receiving apparatus illustrated in FIG. 3.

FIG. 4 is a block diagram of the adaptive receiver 3-1-1. Since the adaptive receivers 3-1-1 to 3-M-1 are designed to have the same structure, only the adaptive receiver 3-1-1 is explained hereinbelow with reference to FIG. 4.

The adaptive receiver 3-1-1 is comprised of first to N-th reverse diffusion units 10-1 to 10-N, an adaptively updating unit 11, first to N-th multipliers 12-1 to 12-N, a first adder 13-1, a second adder 13-2, a delay unit 14, an output multiplier 15-1, an input multiplier 15-2, a communication path estimating unit 16, and a complex conjugate generator 17.

The signals received in the adaptive receiver 3-1-1 are diffused and demodulated in the reverse diffusion units 10-1 to 10-N. The diffused and demodulated signals are multiplied with an antenna weight transmitted from the adaptively updating unit 11, in the first to N-th multipliers 12-1 to 12-N, and thereafter, added to one another in the first adder 13-1. The diffused and demodulated signals are input also to the delay unit 14.

The signals added to one another in the first adder 13-1 are multiplied with reverse characteristics of communication path estimated by the communicating path estimating unit 16 and generated by the complex conjugate generator 17, in the output multiplier 15-1. Estimate in the communication path estimating unit 16 is carried out by measuring transmission path characteristics, sometimes referred to as "symbol-judging", based on periodically inserted known symbols and inserting the measured characteristics in time series to thereby estimate transmission paths for all symbols, as suggested in Mihei, "Compensation for Phasing Deformation in 16QAM for Land Mobile Communication", Electronic Information Communications Academy, Vol, J72-BII, No. 1, pp. 7–15, 1989, for instance.

The output multiplier 15-1 transmits its output signal to the adder 4. The adder 4 adds the received output signal to the output signals transmitted from the second to M-th receivers 3-2 to 3-M. After the adder 4 has added the output signals transmitted from the first to M-th receivers 3-1 to 3-M, to one another, the adder 4 transmits its output signal to the judge 5. The judge result transmitted from the judge 5 is multiplied in the input multiplier 15-2 with the estimated deformation of communication path, transmitted from the communication path estimating unit 16. Thus, a signal before being detected is reproduced.

The second adder 13-2 calculates an error defined as a difference between the thus reproduced signal and the output signal transmitted from the first adder 13-1. The thus calculated error is input into the adaptively updating unit 11 for adaptively updating receipt weight.

The adaptively updating unit 11 adaptively updates receipt weight through the use of the error transmitted from the second adder 13-2 and the output signal transmitted from the delay unit 14. There may be used least mean square error control as an algorithm for adaptively updating receipt weight, where an antenna weight transmitted from the initial receipt weight calculator 3-1-2 is used as initial receipt weight.

Figure 5:
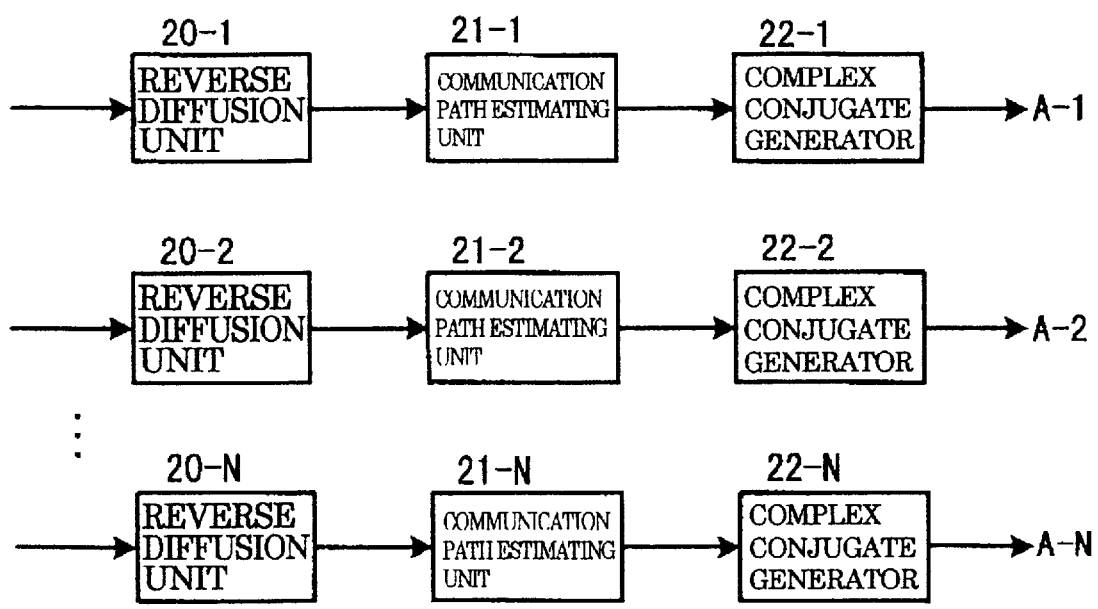
FIG. 5 is a block diagram of an initial receipt weight calculator in the CDMA adaptive antenna receiving apparatus illustrated in FIG. 3.

FIG. 5 is a block diagram of the initial receipt weight calculator 3-1-2. Since the initial receipt weight calculators 3-1-2 to 3-M-2 are designed to have the same structure, only the initial receipt weight calculator 3-1-2 is explained hereinbelow with reference to FIG. 5.

The initial receipt weight calculator 3-1-2 is comprised of first to N-th reverse diffusion units 20-1 to 20-N, first to N-th communication path estimating units 21-1 to 21-N, and first to N-th complex conjugate generators 22-1 to 22-N.

In the initial receipt weight calculator 3-1-2, each of the signals having been received at the first to N-th antennas 1-1 to 1-N is diffused and demodulated in each of the first to N-th reverse diffusion units 20-1 to 20-N.

The thus diffused and demodulated signals are input into the first to N-th communication path estimating units 21-1 to 21-N. Each of the first to N-th communication path estimating units 21-1 to 21-N estimates a communication path for each of the signals received at the first to N-th antennas 1-1 to 1-N.

The first to N-th complex conjugate generators 22-1 to 22-N detects reverse characteristics of the communication paths, based on the output signals transmitted from the communication path estimating units 21-1 to 21-N. The first to N-th complex conjugate generators 22-1 to 22-N transmits output signals A-1 to A-N to the first to M-th adaptive receivers 3-1 to 3-m as initial receipt weights. The output signals A-1 to A-N are transmitted only once when receipt weight starts being updated.

When the antennas 1-1 to 1-N receive a plurality of burst signals at a certain interval, the receipt weights or weight coefficients are calculated for each of the burst signals, based on the received burst signals, and the thus calculated receipt weights are input into the first to M-th adaptive receivers. Hereinafter, the first to N-th adaptive receivers 3-1 to 3-M adaptively updates receipt weights or weight coefficients in the same burst signal, based on the received signals, to thereby detect the signals.

Since the output signals A-1 to A-N transmitted from the complex conjugate generators 22-1 to 22-N represent reverse characteristics of communication paths of the antennas 1-1 to 1-N, it would be possible to compensate for deformation in the communication paths associated with the antennas 1-1 to 1-N by multiplying the reverse characteristics with the signals received at the antennas 1-1 to 1-N and it would be also possible to accomplish in-phase synthesis of the received signals by synthesizing the thus compensated signals to one another. Since the in-phase synthesis maximizes power in a desired signal, it would be possible to establish directivity where beams are directed to a direction in which a desired signal comes, before receipt weight starts being updated.

Figure 6:
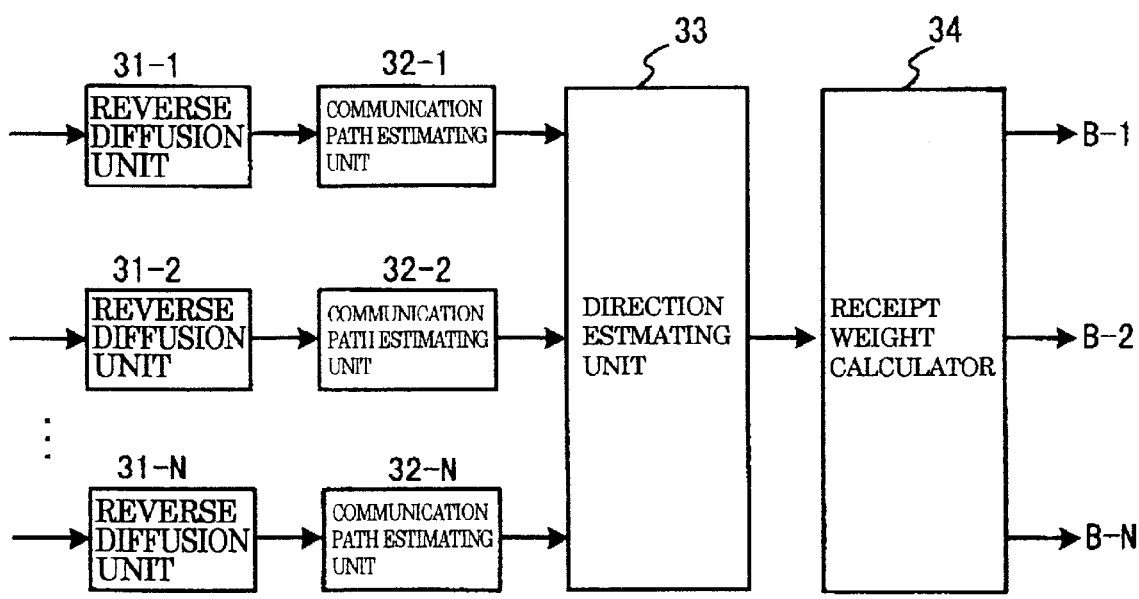
FIG. 6 is a block diagram of another initial receipt weight calculator in the CDMA adaptive antenna receiving apparatus illustrated in FIG. 3.

FIG. 6 is a block diagram of another initial receipt weight calculator in the CDMA adaptive antenna receiving apparatus in accordance with the first embodiment.

In this embodiment, a direction in which signals come is estimated, based on estimated communication path characteristics in each of the antennas, and initial receipt weight is calculated, based on the thus estimated direction.

The initial receipt weight calculator illustrated in FIG. 6 is comprised of first to N-th reverse diffusion units 31-1 to 31-N, first to N-th communication path estimating units 32-1 to 32-N, a direction estimating unit 33, and a receipt weight calculator 34.

The signals having been received at the antennas 1-1 to 1-N are diffused and demodulated in the first reverse diffusion units 31-1 to 31-N for each of the antennas 1-1 to 1-N. The first to N-th communication path estimating units 32-1 to 32-N receive the thus diffused and demodulated signals from the first to N-th reverse diffusion units 31-1 to 31-N, respectively, and estimate communication path characteristics of each of the antennas 1-1 to 1-N.

The direction estimating unit 33 estimates a direction in which the received signals came, based on the output signal transmitted from the first to N-th communication path estimating units 32-1 to 32-N.

Estimation of the direction may be accomplished by means of, for instance, MUSIC (Multiple Signal Classification) algorithm suggested in R. O. Schmidt, "Multiple Emitter Location and Signal Parameter Estimation", IEEE Trans. Vol. AP-34, No. 3, pp. 276–286, March 1986, or ESPRIT algorithm suggested in R. Roy and T. Kailath, "ESPRIT-Estimation of Signal Parameters via Rotational Invariance Techniques", IEEE Trans. Vol. ASSP-37, pp. 984–995, July 1989.

As an alternative, since a difference in communication path characteristics among the antennas constitutes of a phase difference in received signals, which phase difference is determined only by geometrical arrangement of antennas and a direction in which signals come, a direction in which signals come can be estimated based on a phase difference in received signals.

Figure 7:
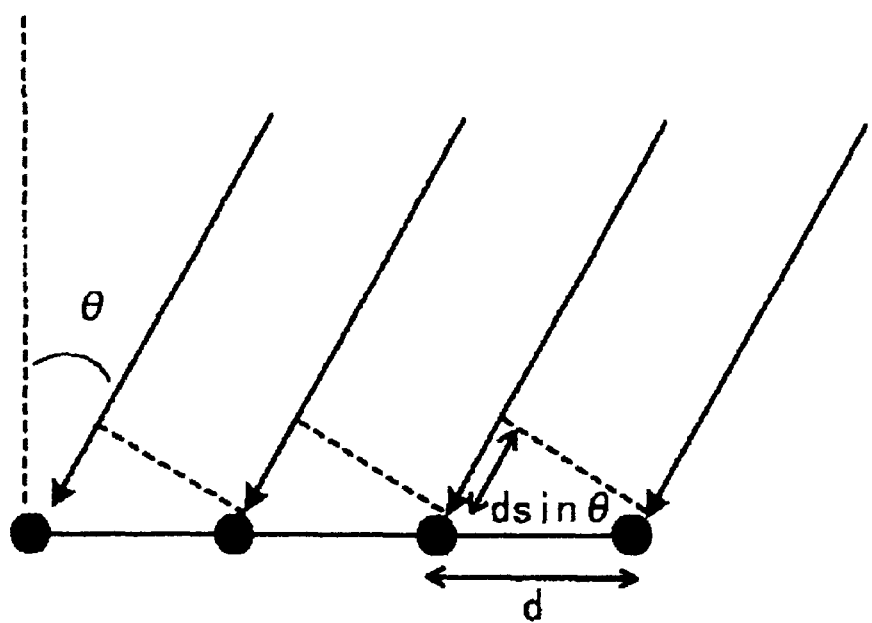
FIG. 7 illustrates a difference between a direction in which signals arrive at antennas arranged in a line, and a phase in received signals.

FIG. 7 shows a relation between a phase difference in signals received at antennas arranged in a line, and a direction in which signals come. A phase difference $\Theta$ between adjacent antennas is defined in accordance with the following equation.

$$\Theta = 2\pi \frac{d \sin \theta}{\lambda} = \pi \sin \theta$$

In the equation, "d" indicates a distance between antennas, and "$\theta$" indicates a direction in which signals come.

In the equation, the distance "d" is set equal to a half of a wavelength of a carrier wave. Accordingly, it is possible to approximate estimated communication path between adjacent antennas to a phase difference between the antennas.

Assuming that hn(t) indicates estimation of n-th communication path at time "t" ($0 \leq n < N-1$), correlation $R_{n, n+1}(t)$ between hn(t) and $h_{n+1}(t)$ at time "t" is defined in accordance with the following equation.

$$R_{n,n+1}(t) = h_n(t) h^*_{n+1}(t)$$

In the equation, "*" indicates complex conjugate.

Correlation R(t) obtained by averaging the above-mentioned correlation $R_{n, n+1}(t)$ by the antennas at time "t" is defined in accordance with the following equation.

$$R(t) = \frac{1}{N-1} \sum_{n=0}^{N-2} R_{n,n+1}(t)$$

Further, time-averaged correlation R obtained by time-averaging the correlation R(t) is defined in accordance with the following equation.

$$R = \frac{1}{T} \sum_{t=0}^{T-1} R(t) = \frac{1}{T} \sum_{t=0}^{T-1} \frac{1}{N-1} \sum_{n=0}^{N-2} R_{n,n+1}(t)$$

Thus, the angle $\theta$ in which signals come can be calculated as follows.

$$\theta = \sin^{-1}\left[\frac{1}{\pi} \arg(R)\right]$$

The receipt weight calculator 34 calculates receipt weights by which a received phase can be turned into a reverse phase, based on the estimated direction, and outputs the thus calculated receipt weights B-1 to B-N as initial receipt weights. The initial receipt weights B-1 to B-N are output only once when receipt weights start being updated, similarly to the output signals A-1 to A-N transmitted from the first to N-th complex conjugate generators 22-1 to 22-N illustrated in FIG. 5.

It is necessary that a period of time necessary for the first to M-th initial receipt weight calculators 3-1-2 to 3-M-2 to output initial receipt weights is shorter than a period of time for adaptive control weight using the receipt weight to converge. The initial receipt weight calculators illustrated in FIGS. 5 and 6 make it possible to output receipt weights rapidly.

Figure 8:
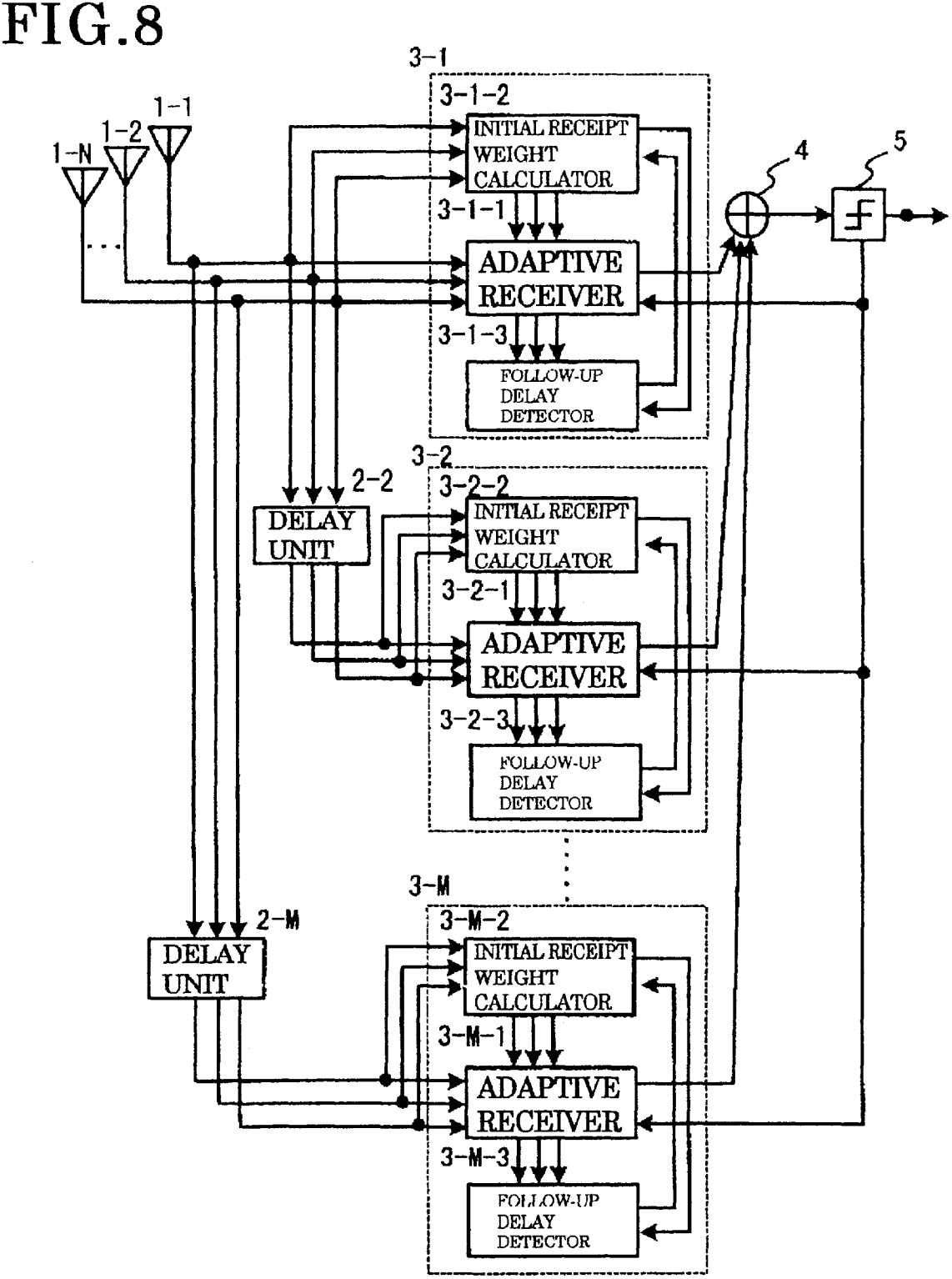
FIG. 8 is a block diagram of a CDMA adaptive antenna receiving apparatus in accordance with the second embodiment of the present invention.

FIG. 8 is a block diagram of a CDMA adaptive antenna receiving apparatus in accordance with the second embodiment of the present invention. The illustrated CDMA adaptive antenna receiving apparatus is directed to a K-th user wherein K is an integer equal to or greater than 1.

The CDMA adaptive antenna receiving apparatus is comprised of first to N-th antennas 1-1 to 1-N wherein N is an integer equal to or greater than 2, first to M-th multi-paths wherein M is an integer equal to or greater than 1, first to M-th receivers 3-1 to 3-M, first to (M−1)-th delay units 2-2 to 2-M, an adder 4, and a judge 5.

Each of the first to M-th receivers 3-1 to 3-M is comprised of an adaptive receiver 3-1-1 to 3-M-1, an initial receipt weight calculator 3-1-2 to 3-M-2, and a follow-up delay detector 3-1-3 to 3-M-3.

The first to N-th antennas 1-1 to 1-N are connected to the first to M-th receivers 3-1 to 3-M through the first to M-th multi-paths. Signals received at the first to N-th antennas 1-1 to 1-N are transmitted directly to the first receiver 3-1, and transmitted to the second to M-th receivers 3-2 to 3-M through the first to (M−1)-th delay units 2-2 to 2-M. The first to (M−1)-th delay units 2-2 to 2-M delays the received signals such that the received signals in the multi-paths are synchronized with one another.

Output signals transmitted from the first to M-th receivers 3-1 to 3-M are added to one another in the adder 4. The adder 4 transmits its output signal to the judge 5, and the judge 5 judges transmission symbol of the K-th user, based on the received output signal. The judged symbol is input into the first to M-th receivers 3-1 to 3-M for updating receipt weight.

Since the adaptive receivers 3-1-1 to 3-M-1 are designed to have the basically same structure as the structure of the adaptive receiver 3-1-1 in the first embodiment, having been explained with reference to FIG. 4. The adaptive receivers 3-1-1 to 3-M-1 in the second embodiment are structurally different from the adaptive receiver 3-1-1 in the first embodiment in that the adaptively updating unit 11 outputs receipt weight non only to the first to N-th multipliers 12-1 to 12-N, but also to the follow-up delay detector 3-1-3, and that when the adaptive receiver 3-1-1 receives initial receipt weight from the initial weight calculator 3-1-2, the adaptive receiver 3-1-1 surely continues updating receipt weight, based on the received initial receipt weight. The adaptive receivers 3-1-1 to 3-M-1 in the second embodiment operate in the same way as the adaptive receiver 3-1-1 in the first embodiment except the above-mentioned ones.

Figure 9:
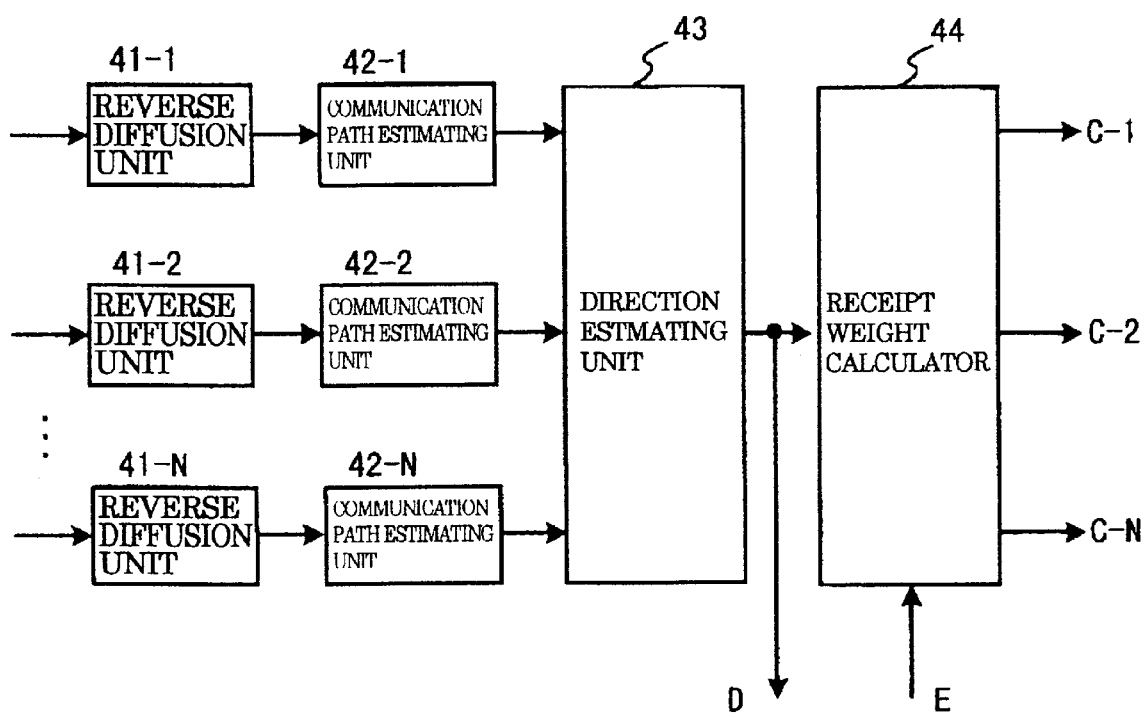
FIG. 9 is a block diagram of an initial weight calculator in the CDMA adaptive antenna receiving apparatus illustrated in FIG. 8.

FIG. 9 is a block diagram of the first initial receipt weight calculator 3-1-2 in the second embodiment.

The initial receipt weight calculator 3-1-2 illustrated in FIG. 9 is comprised of first to N-th reverse diffusion units 41-1 to 41-N, first to N-th communication path estimating units 42-1 to 42-N, a direction estimating unit 43, and a receipt weight calculator 44.

The initial receipt weight calculator 3-1-2 illustrated in FIG. 9 has the same structure as that of the initial receipt weight calculator in the first embodiment, illustrated in FIG. 6, except that the direction estimating unit 43 transmits its estimation signal not only to the receipt weight calculator 44, but also to the follow-up delay detector 3-1-3 as an output signal D, and that the receipt weight calculator 44 outputs receipt weights C-1 to C-N on receipt of a preset input signal E.

Figure 10:
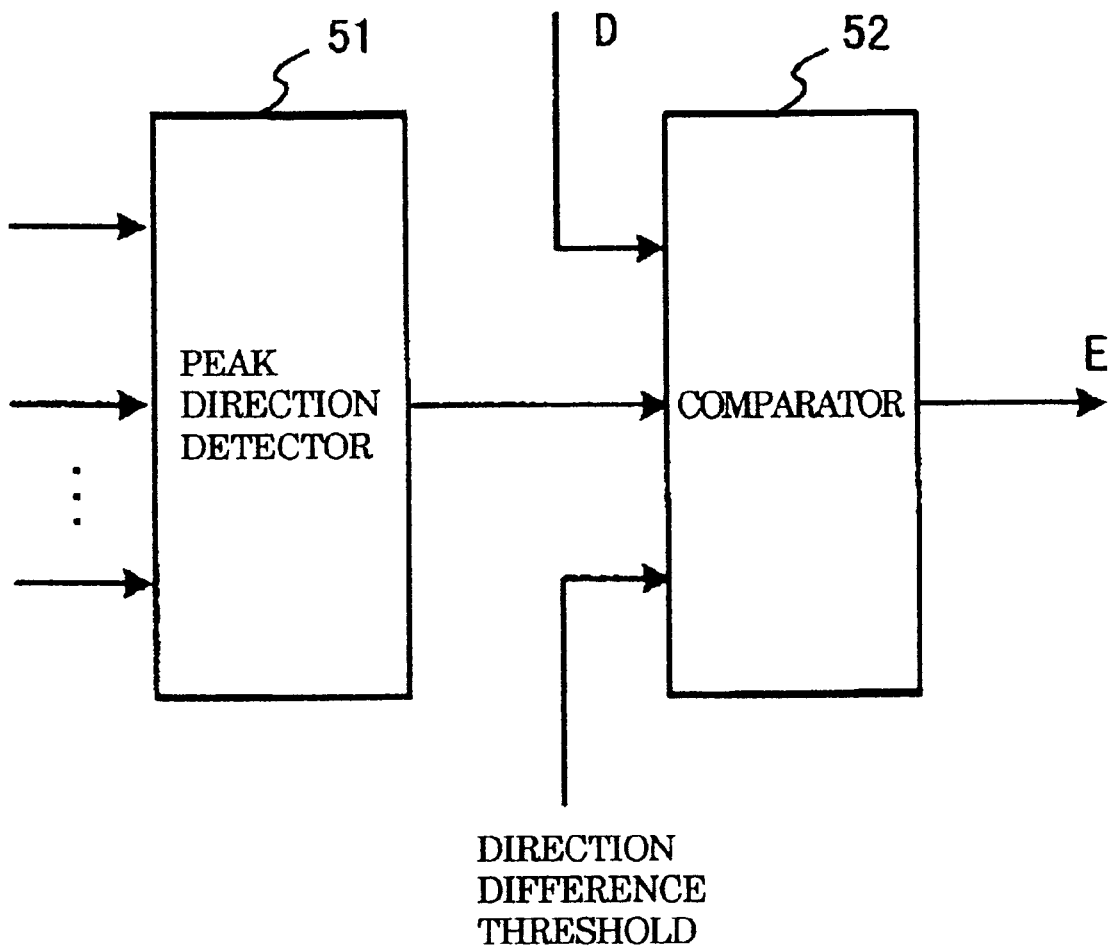
FIG. 10 is a block diagram of a follow-up delay detector in the CDMA adaptive antenna receiving apparatus illustrated in FIG. 8.

FIG. 10 is a block diagram of the follow-up delay detector in the second embodiment. Since the first to M-th follow-up delay detectors 3-1-3 to 3-M-3 have the same structure, only the first follow-up delay detector 3-1-3 is explained herein-below with reference to FIG. 10.

As illustrated in FIG. 10, the first follow-up delay detector 3-1-3 is comprised of a peak direction detector 51 and a comparator 52.

On receipt of receipt weight from the first adaptive receiver 3-1-1, the peak direction detector 51 detects a peak direction, and outputs the thus detected peak direction to the comparator 52.

The peak direction detector 51 detects a peak direction, for instance, by calculating correlation among receipt weights.

Assuming that wn(t) indicates n-th receipt weight at time "t" (0≦n<N−1), correlation $R_{n,\ n+1}$ (t) between wn(t) and $w_{n+1}$(t) at time "t" is defined in accordance with the following equation.

$$R_{n,n+1}(t)=w_n(t)w^*_{n+1}(t)$$

In the equation, "*" indicates complex conjugate.

Correlation R(t) obtained by averaging the above-mentioned correlation $R_{n,\ n+1}$ (t) by the antennas at time "t" is defined in accordance with the following equation.

$$R(t) = \frac{1}{N-1}\sum_{n=0}^{N-2}R_{n,n+1}(t)$$

Further, time-averaged correlation R obtained by time-averaging the correlation R(t) is defined in accordance with the following equation.

$$R = \frac{1}{T}\sum_{t=0}^{T-1}R(t) = \frac{1}{T}\sum_{t=0}^{T-1}\frac{1}{N-1}\sum_{n=0}^{N-2}R_{n,n+1}(t)$$

As having been explained in the first embodiment, the angle θ in which signals come can be calculated as follows.

$$\theta = \sin^{-1}\left[\frac{1}{\pi}\arg(R)\right]$$

The thus calculated angle θ is output from the peak direction detector 51.

As an alternative, there may be calculated correlation between receipt weight transmitted from the first adaptive receiver 3-1-1 and fixed beam weights in all directions. The peak direction detector 51 may be designed to output a signal indicative of a direction of fixed beam weight in which the correlation is maximum.

The comparator 52 calculates a difference between the output signal transmitted from the peak direction detector 51 and the estimated direction D transmitted from the direction estimating unit 43, and compares the thus calculated difference with a direction difference threshold. When the difference is greater than the direction difference threshold, the comparator 52 judges that follow-up delay of adaptive control weight occurs, and outputs the preset signal E accordingly.

In accordance with the second embodiment, even if a direction in which signals come rapidly changes, the initial receipt weight calculators can promptly apply receipt weight which compensates for the rapid change in the direction, to the adaptive control, and hence, it would be possible to avoid degradation in characteristics, caused by follow-up delay in adaptively updating receipt weight.

Though the above-mentioned first and second embodiments are concerned in CDMA, it should be noted that the present invention may be applied not only to CDMA, but also to TDMA or FDMA by separating a plurality of incoming waves by means of training series or in-phase series, as suggested in H. Yoshino, K. Fukawa and H. Suzuki, "Interference Canceling Equalizer (ICE) for Mobile Radio Communications", Proc. ICC, pp. 1427–1432 (1994).

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-261175 filed on Aug. 30, 2000 including specification, claims, drawings and summary is incorporated herein by reference in its entirety.

What is claimed is:

1. An adaptive antenna receiving apparatus which receives signals at a plurality of antennas, multiplies each of the thus received signals with a weighting coefficient, and adds the products to one another to thereby detect said signals, comprising:

(a) an initial weighting coefficient calculator which calculates an initial weighting coefficient, based on said received signals; and (b) an adaptive receiver which updates said weighting coefficient in accordance with said received signals.

2. The adaptive antenna receiving apparatus as set forth in claim 1, wherein said signals are comprised of a plurality of burst signals to be received at a certain interval, and wherein said initial weighting coefficient calculator calculates said initial weighting coefficient for each of said burst signals, and said adaptive receiver updates said weighting coefficient in accordance with said received signals in the same burst signal.

3. An adaptive antenna receiving apparatus comprising:

(a) a plurality of antennas;

(b) a plurality of adaptive receivers each of which receives signals received in said antennas, in an adaptive antenna pattern in an order in which said signals arrived at said antennas;

(c) a plurality of initial receipt weight calculators each of which calculates an initial antenna pattern for each of said signals, and outputs the thus calculated initial antenna pattern to each of said adaptive receivers;

(d) an adder which adds output signals transmitted from each of said adaptive receivers, to one another; and (e) a judge which symbol-judges an output signal transmitted from said adder, and transmits an output signal to each of said adaptive receivers.

4. The adaptive antenna receiving apparatus as set forth in claim 3, wherein each of said adaptive receivers is comprised of:

(b1) a plurality of first multipliers each of which multiplies each of said received signals with a weighting coefficient;

(b2) an adder which outputs transmitted from said first multipliers, to one another;

(b3) a communication path estimating unit which estimates a communication path, based on an output signal transmitted from said adder, and outputs a first signal indicative of an estimated communication path;

(b4) a second multiplier which multiplies an output signal transmitted from said judge, with said first signal;

(b5) a subtracter which subtracts an output signal transmitted from said second multiplier, from an output signal transmitted from said adder; and (b6) an updating unit which adaptively calculates receipt weight, based on an output signal transmitted from said subtracter, a signal obtained by delaying said received signals, and initial receipt weight transmitted from each of said initial receipt weight calculators, each of said adaptive receivers controlling its receipt weight independently of other adaptive receivers.

5. The adaptive antenna receiving apparatus as set forth in claim 3, wherein each of said initial receipt weight calculators is comprised of:

(c1) a plurality of communication path estimating units each receiving each of signals received in said antennas; and (c2) a plurality of complex conjugate generators each receiving an output signal transmitted from each of said communication path estimating units, and wherein an output signal transmitted from each of said complex conjugate generators is transmitted to each of said adaptive receivers as an initial value for weight control to be made in each of said adaptive receivers.

6. The adaptive antenna receiving apparatus as set forth in claim 3, wherein each of said initial receipt weight calculators is comprised of:

(c1) a plurality of communication path estimating units each receiving each of signals received in said antennas;

(c2) a direction estimating unit which estimates a direction in which a signal comes to said antennas, based on output signals transmitted from said communication path estimating units; and (c3) a receipt weight calculator which calculates receipt weight, based on output signals transmitted from said direction estimating unit, and wherein said receipt weight calculator transmits its output signal to each of said adaptive receivers in accordance with a signal transmitted from each of said delay detectors as an initial value for weight control to be made in each of said adaptive receivers.

7. A CDMA adaptive antenna receiving apparatus comprising:

(a) a plurality of antennas;

(b) a plurality of adaptive receivers which receive signals received in said antennas, in an adaptive antenna pattern in an order in which said signals arrived at said antennas;

(c) a plurality of initial receipt weight calculators each of which calculates an initial antenna pattern for each of said signals, and outputs the thus calculated initial antenna pattern to each of said adaptive receivers;

(d) an adder which adds output signals transmitted from each of said adaptive receivers, to one another; and (e) a judge which symbol-judges an output signal transmitted from said adder, and transmits an output signal to each of said adaptive receivers.

8. The CDMA adaptive antenna receiving apparatus as set forth in claim 7, wherein each of said adaptive receivers is comprised of:

(b1) a plurality of reverse diffusion units each associated with each of said signals received in said antennas;

(b2) a plurality of first multipliers each of which multiplies each of output signals transmitted from said reverse diffusion units, with a weighting coefficient;

(b3) an adder which outputs transmitted from said first multipliers, to one another;

(b4) a communication path estimating unit which estimates a communication path, based on an output signal transmitted from said adder, and outputs a first signal indicative of an estimated communication path;

(b5) a second multiplier which multiplies an output signal transmitted from said judge, with said first signal;

(b6) a subtracter which subtracts an output signal transmitted from said second multiplier, from an output signal transmitted from said adder; and (b7) an updating unit which adaptively calculates receipt weight, based on an output signal transmitted from said subtracter, signals obtained by delaying signals transmitted from said reverse diffusion units, and initial receipt weight transmitted from each of said initial receipt weight calculators, each of said adaptive receivers controlling its receipt weight independently of other adaptive receivers.

9. The CDMA adaptive antenna receiving apparatus as set forth in claim 7, wherein each of said initial receipt weight calculators is comprised of:
   (c1) a plurality of reverse diffusion units each associated with each of said signals received in said antennas;
   (c2) a plurality of communication path estimating units each receiving an output signal transmitted from each of said reverse diffusion units; and
   (c3) a plurality of complex conjugate generators each receiving an output signal transmitted from each of said communication path estimating units,
   and wherein an output signal transmitted from each of said complex conjugate generators is transmitted to each of said adaptive receivers as an initial value for weighting control to be made in each of said adaptive receivers.

10. The CDMA adaptive antenna receiving apparatus as set forth in claim 7, wherein each of said initial receipt weight calculators is comprised of:
    (c1) a plurality of reverse diffusion units each associated with each of said signals received in said antennas;
    (c2) a plurality of communication path estimating units each receiving an output signal transmitted from each of said reverse diffusion units;
    (c3) a direction estimating unit which estimates a direction in which a signal comes to said antennas, based on output signals transmitted from said communication path estimating units; and
    (c4) a receipt weight calculator which calculates receipt weight, based on output signals transmitted from said direction estimating unit,
    and wherein said receipt weight calculator transmits its output signal to each of said adaptive receivers as an initial value for weight control to be made in each of said adaptive receivers.

11. An adaptive antenna receiving apparatus comprising:
    (a) a plurality of antennas;
    (b) a plurality of adaptive receivers which receive signals received in said antennas, in an adaptive antenna pattern in an order in which said signals arrived at said antennas;
    (c) a plurality of initial receipt weight calculators each of which calculates initial receipt weight for adaptive control by means of said antenna pattern, and outputs the thus calculated initial receipt weight to each of said adaptive receivers;
    (d) a plurality of delay detectors each of which detects a directional difference between receipt weight calculated by each of said adaptive receivers and a direction in which said signals come to said antennas, estimated by said initial receipt weight calculators, and notifies each of said initial receipt weight calculators that said directional difference is over a predetermined directional difference threshold such that each of said initial receipt weight calculators transmits said initial receipt weight to each of said adaptive receivers;
    (e) an adder which adds output signals transmitted from each of said adaptive receivers, to one another; and
    (f) a judge which symbol-judges an output signal transmitted from said adder, and transmits an output signal to each of said adaptive receivers.

12. The adaptive antenna receiving apparatus as set forth in claim 11, wherein each of said adaptive receivers is comprised of:
    (b1) a plurality of first multipliers each of which multiplies each of said received signals with a weighting coefficient;
    (b2) an adder which outputs transmitted from said first multipliers, to one another;
    (b3) a communication path estimating unit which estimates a communication path, based on an output signal transmitted from said adder, and outputs a first signal indicative of an estimated communication path;
    (b4) a second multiplier which multiplies an output signal transmitted from said judge, with said first signal;
    (b5) a subtracter which subtracts an output signal transmitted from said second multiplier, from an output signal transmitted from said adder; and
    (b6) an updating unit which calculates receipt weight, based on an output signal transmitted from said subtracter, a signal obtained by delaying said received signals, and said initial receipt weight,
    each of said adaptive receivers controlling its receipt weight independently of other adaptive receivers and outputting the controlled receipt weight to each of said delay detectors.

13. The adaptive antenna receiving apparatus as set forth in claim 11, wherein each of said initial receipt weight calculators is comprised of:
    (c1) a plurality of communication path estimating units each receiving each of signals received in said antennas;
    (c2) a direction estimating unit which estimates a direction in which a signal comes to said antennas, based on output signals transmitted from said communication path estimating units; and
    (c3) a receipt weight calculator which calculates receipt weight, based on output signals transmitted from said direction estimating unit,
    and wherein said direction estimating unit transmits its output signal to said receipt weight calculator, and said receipt weight calculator transmits its output signal to each of said adaptive receivers in accordance with a signal transmitted from each of said delay detectors as initial value for weight control to be made in each of said adaptive receivers.

14. The adaptive antenna receiving apparatus as set forth in claim 11, wherein each of said delay detectors is comprised of:
    (d1) a peak direction detector which detects a direction of maximum directivity of the receipt weight, based on receipt weight transmitted from said adaptive receivers; and
    (d2) a comparator which detects a difference in a peak direction between a direction transmitted from each of said initial receipt weight calculators and said direction of maximum directivity, and transmits a signal to said initial receipt weight calculators such that each of said initial receipt weight calculators transmits said initial receipt weight, when said difference is over a predetermined threshold difference.

15. A CDMA adaptive antenna receiving apparatus comprising:
    (a) a plurality of antennas;
    (b) a plurality of adaptive receivers which receive signals received in said antennas, in an adaptive antenna pattern in an order in which said signals arrived at said antennas;
    (c) a plurality of initial receipt weight calculators each of which calculates initial receipt weight for adaptive control by means of said antenna pattern, and outputs the thus calculated initial receipt weight to each of said adaptive receivers;

(d) a plurality of delay detectors each of which detects a directional difference between a weighting coefficient calculated by each of said adaptive receivers and a direction in which said signals come to said antennas, estimated by said initial receipt weight calculators, and notifies each of said initial receipt weight calculators that said directional difference is over a predetermined directional difference threshold such that each of said initial receipt weight calculators transmits said initial antenna pattern to each of said adaptive receivers;

(e) an adder which adds output signals transmitted from each of said adaptive receivers, to one another; and (f) a judge which symbol-judges an output signal transmitted from said adder, and transmits an output signal to each of said adaptive receivers.

16. The CDMA adaptive antenna receiving apparatus as set forth in claim 15, wherein each of said adaptive receivers is comprised of:

(b1) a plurality of reverse diffusion units each associated with each of said signals received in said antennas;

(b2) a plurality of first multipliers each of which multiplies each of output signals transmitted from said reverse diffusion units, with a weighting coefficient;

(b3) an adder which outputs transmitted from said first multipliers, to one another;

(b4) a communication path estimating unit which estimates a communication path, based on an output signal transmitted from said adder, and outputs a first signal indicative of an estimated communication path;

(b5) a second multiplier which multiplies an output signal transmitted from said judge, with said first signal;

(b6) a subtracter which subtracts an output signal transmitted from said second multiplier, from an output signal transmitted from said adder; and (b7) an updating unit which calculates receipt weight, based on an output signal transmitted from said subtracter, signals obtained by delaying signals transmitted from said reverse diffusion units, and said initial receipt weight transmitted from each of said initial receipt weight calculators, each of said adaptive receivers controlling its receipt weight independently of other adaptive receivers and outputting the controlled receipt weight to each of said delay detectors.

17. The CDMA adaptive antenna receiving apparatus as set forth in claim 15, wherein each of said initial receipt weight calculators is comprised of:

(c1) a plurality of reverse diffusion units each associated with each of said signals received in said antennas;

(c2) a plurality of communication path estimating units each receiving an output signal transmitted from each of said reverse diffusion units; and (c3) a direction estimating unit which estimates a direction in which a signal comes to said antennas, based on output signals transmitted from said communication path estimating units; and (c4) a receipt weight calculator which calculates receipt weight, based on output signals transmitted from said direction estimating unit, said direction estimating unit transmitting its output signal to said receipt weight calculator, said receipt weight calculator transmits its output signal to each of said adaptive receivers in accordance with a signal transmitted from each of said delay detectors as an initial value for weight control to be made in each of said adaptive receivers.

18. The CDMA adaptive antenna receiving apparatus as set forth in claim 15, wherein each of said delay detectors is comprised of:

(d1) a peak direction detector which detects a direction of maximum directivity of the receipt weight, based on receipt weight transmitted from said adaptive receivers; and (d2) a comparator which detects a difference in a peak direction between a direction transmitted from each of said initial receipt weight calculators and said direction of maximum directivity, and transmits a signal to said initial receipt weight calculators such that each of said initial receipt weight calculators transmits said initial weight, when said difference is over a predetermined threshold difference.

* * * * *